Jan. 19, 1965  R. W. BUNTENBACH  3,166,689
CHARGING CIRCUIT FOR EXPLODING BRIDGE WIRES
Filed Feb. 19, 1962

INVENTOR.
Rudolph W. Buntenbach
BY

United States Patent Office 3,166,689
Patented Jan. 19, 1965

3,166,689
CHARGING CIRCUIT FOR EXPLODING
BRIDGE WIRES
Rudolph W. Buntenbach, San Francisco, Calif., assignor to General Precision, Inc., a corporation of Delaware
Filed Feb. 19, 1962, Ser. No. 174,090
2 Claims. (Cl. 317—80)

The present invention relates to arrangements for effecting explosion of thin wires known as exploding "bridge wires," by passing an electric current pulse of high intensity through said wires. This may be accomplished by connecting the wire across a condenser of predetermined size, providing a source of electromotive force for charging the condenser and effecting sudden discharge of the charged condenser through the bridge wire at a voltage level of sufficient height to assure explosion of the wire. This voltage level is usually predetermined by interposing a spark gap of predetermined size between the condenser and the bridge wire. When the voltage building up in the condenser reaches a level whereat the spark gap breaks down, a sudden current pulse of high intensity negotiates the gap and passes through the bridge wire causing it to explode.

Since the electromotive force required to explode a bridge is high, the means for charging the condenser require usually a source of high voltage and involve components that are capable of carrying high voltages. This renders the firing circuit costly. Furthermore, a source of high voltage is frequently not readily available at locations where exploding bridge wires are used in practice so that the use of costly step-up transformers becomes necessary to charge the firing condenser to the required voltage level.

It is an object of my invention to provide an arrangement for charging the firing condenser of devices of the type referred to, that is simple, effective and inexpensive.

More specifically, it is an object of my invention to provide an arrangement capable of charging the firing condenser to the required voltage level from a source of low voltage, and in any case, from a source of electromotive force of a substantially lower voltage than the voltage required to effect break down of the spark gap and firing of the bridge wire.

Figure 1:
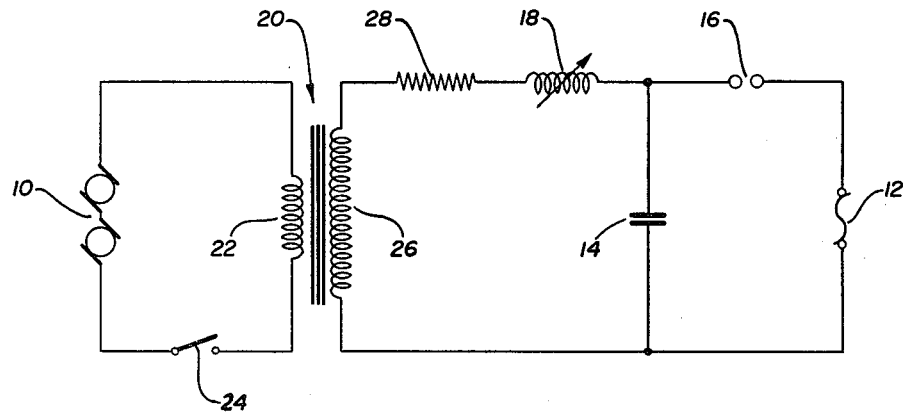
Figure 2:
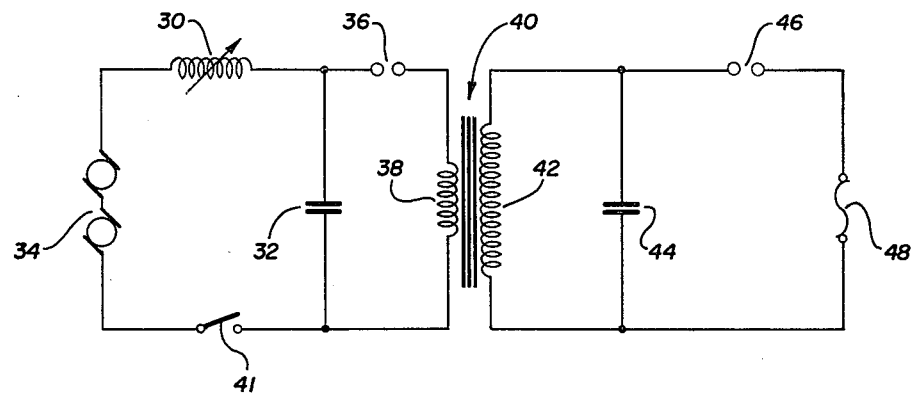

These and other objects of the present invention will be apparent from the following description of the accompanying drawing which illustrates certain preferred embodiments thereof and wherein FIGURE 1 is a circuit diagram of an embodiment of the invention; and FIGURE 2 is a circuit diagram of a modified embodiment of the invention.

My invention makes use of the phenomenon of resonance to charge a firing condenser from a source of alternating current electromotive force of relatively low voltage to the firing point which may be located at a voltage level many times higher than the voltage of the source of electromotive force.

In FIGURE 1 of the accompanying drawing, the reference numeral 10 designates an alternating current generator of relatively low voltage, for instance a 60 cycle 300 volt generator. The reference numeral 12 indicates a bridge wire that is connected across a firing condenser 14, with a spark gap 16 interposed between the condenser and the wire. The gap 16 is of such size that it requires a substantial voltage, say 2000 volts, for an electric current to disrupt the gap, and the condenser 14 is of sufficient size for the current discharged through the gap at the breakdown voltage thereof to dependably effect explosion of the exploding bridge wire 12.

To assure dependable operation of the described firing circuit, means must be provided that is capable of charging the condenser 14 to at least the break-down voltage of the spark gap 16 and, preferably to a substantially higher voltage than said break-down voltage, say 5000 volts. In accordance with my invention I charge the condenser to at lease the break-down voltage of the gap 16 from a source of electromotive force of substantially lower voltage, such as the previously mentioned generator 10, by making the firing condenser part of a series resonant circuit that is tuned to the frequency of, and is suitably coupled to, the source of voltage 10.

Having again reference to FIGURE 1, the firing condenser 14 is connected in series with a variable inductance indicated at 18 to form a series resonant circuit that may be tuned to precisely the frequency of the source of alternating voltage 10 by appropriate setting of the variable inductance 18. The series resonant circuit 14/18 is coupled to the source of voltage 10 by a step-up transformer 20 having a primary 22 that is connected across the source of voltage 10, and a secondary 26 of a larger number of turns than the primary that is serially connected to the resonant circuit 14/18 through a suitable loading resistor 28.

When the alternating current generator 10 is rendered effective, for instance by closing a suitable switch 24 connected in series with the generator 10 and the primary 22, the transformer 20 delivers the alternating voltage at a stepped-up rate to the circuit 14/18 which, if tuned to the frequency of the generator 10, begins to resonate. Thus, the condenser 14 is rapidly charged to voltage levels which are substantially higher than the voltage supplied by the generator and which are more than adequate to disrupt the spark gap 16 so that a current pulse of high magnitude is passed through the bridge wire 12 and causes it to explode. Thus, the exploding bridge wire circuit of my invention is effectively charged from a source of power of a substantially lower alternating current voltage than the voltage required to disrupt the spark gap 16 and cause explosion of the bridge wire, and which is less costly and more commonly available than the higher voltage sources of electromotive force that were formerly considered necessary to charge and fire exploding bridge wire circuits. Furthermore, the arrangement of the present invention effects firing automatically once it has been connected to the source of electromotive force, and requires no special triggering components. In addition, it provides an important safety feature in that it may be temporarily disabled, even if connected to the source of electromotive force, by detuning the resonant circuit 14/18. If said circuit is tuned to a frequency substantially different from the frequency of the source of power 10 by manipulation of the variable inductance 18, the arrangement is incapable, due to the absence of resonance with the supplied oscillations, to charge the condenser to the voltage level required for disrupting the spark gap 16, and firing therefore cannot occur.

The embodiment of the invention illustrated in FIGURE 2 is somewhat more complex than, and differs from the embodiment illustrated in FIGURE 1, in that the low voltage source of electromotive force is connected directly into the resonant circuit, and the current surges produced by discharge of the charged condenser through the voltage-level-determining spark gap are employed to energize the primary of a step-up transformer whose secondary charges a second condenser, which is the actual firing condenser, to the voltage level required for firing the bridge wire. In FIGURE 2 the resonant circuit is formed by the variable inductance 30 and the condenser 32 which are connected in series with each other and with the source of voltage 34. Connected across the condenser 32 is a spark gap 36 and the primary 38 of a step-up transformer 40. When the source of voltage is rendered effective, for instance, by closing a switch 41, it charges the condenser 32 to a much higher voltage level than its own voltage level if the variable inductance 30 is set to cause the series circuit to resonate at the frequency of said source of voltage. When the resonance charges applied to condenser 32 exceed the level determined by the spark gap 36, and disrupt said gap, and cause a high voltage current to pass through the gap and the primary 38 of the transformer 40, current pulses of a still higher voltage are induced into the secondary 42 of said transformer. Connected across said secondary is the actual firing condenser 44, and connected across said firing condenser is a second spark gap 46 and the bridge wire 48 in series. When the current pulses induced into the secondary 42 by break-down of the first spark gap 36 charge the firing condenser 40 to or beyond the voltage level determined by the second spark gap 46, said gap breaks down, and the discharge current of condenser 44 surges through the bridge wire 48; and since the second spark gap is so dimensioned as to pass only current pulses of sufficient magnitude to cause explosion of the bridge wire, said wire will dependably explode as soon as the charges in condenser 44 have reached the magnitude at which the gap 46 breaks down.

In both embodiments of the invention a tuned resonant circuit is employed to increase the amplitudes of an alternating source of electromotive force of relatively low voltage so as to charge a firing condenser to the substantially higher voltage level required for firing the bridge wire.

While I have explained my invention with the aid of two exemplary embodiments thereof, it will be understood that the invention is not limited to the specific circuit arrangements and components described and illustrated by way of example, which may be departed from without departing from the scope and spirit of the invention.

I claim:
1. A firing circuit for firing an exploding bridge wire comprising a firing condenser, a spark gap, an exploding bridge wire in series with said spark gap connected across said condenser, and means for charging the condenser from an alternating source of electromotive power of relatively low voltage to a voltage level substantially above the voltage of said source including a step-up transformer having primary and secondary windings, means for connecting said primary across said source of voltage, and an inductance connected in series with said secondary winding and said firing condenser to form a series-resonant circuit tuned to the frequency of the source of voltage whereby said alternating current source is built up to charge said condenser and without the use of a switch to discharge said condenser across said gap into said bridge wire to cause the same to explode.

2. Circuit according to claim 1 wherein said inductance is variable.

References Cited in the file of this patent
UNITED STATES PATENTS

| | | |
|---|---|---|
| 548,511 | Boucherot | Oct. 22, 1895 |
| 1,207,347 | Kowalski-Wierusz | Dec. 5, 1916 |
| 1,948,704 | Fischer | Feb. 27, 1934 |
| 2,173,450 | Larsen et al. | Sept. 19, 1939 |
| 2,313,101 | Stuart | Mar. 9, 1943 |
| 2,326,696 | Stoddard | Aug. 10, 1943 |
| 2,391,611 | Back | Dec. 25, 1945 |
| 2,521,513 | Gray | Sept. 5, 1950 |
| 2,672,813 | Conner | Mar. 23, 1954 |
| 2,779,857 | Mironoff | Jan. 29, 1957 |
| 2,826,721 | Smith | Mar. 11, 1958 |
| 2,899,864 | Bloxsom | Aug. 18, 1959 |
| 2,966,574 | Maillet | Dec. 27, 1960 |
| 3,027,493 | Smits | Mar. 27, 1962 |

FOREIGN PATENTS

| | | |
|---|---|---|
| 320,243 | Switzerland | May 15, 1957 |
| 951,658 | Germany | Oct. 31, 1956 |